(12) United States Patent
Piehler

(10) Patent No.: US 10,133,064 B2
(45) Date of Patent: Nov. 20, 2018

(54) HEAD-UP DISPLAY AND OPTICAL PROJECTION SYSTEM FOR A HEAD-UP DISPLAY

(71) Applicant: Jabil Optics Germany GmbH, Jena (DE)

(72) Inventor: Eberhard Piehler, Lehesten OT Nerkewitz (DE)

(73) Assignee: Jabil Optics Germany GmbH, Jena (DE)

( * ) Notice: Subject to any disclaimer, the term of this patent is extended or adjusted under 35 U.S.C. 154(b) by 136 days.

(21) Appl. No.: 13/966,581

(22) Filed: Aug. 14, 2013

(65) Prior Publication Data

US 2014/0049819 A1 Feb. 20, 2014

(30) Foreign Application Priority Data

Aug. 15, 2012 (DE) .................... 10 2012 214 533

(51) Int. Cl.
| | | |
|---|---|---|
| *G02B 27/14* | (2006.01) | |
| *G02B 27/01* | (2006.01) | |
| *G02B 27/09* | (2006.01) | |
| *G02B 13/08* | (2006.01) | |

(52) U.S. Cl.
CPC ......... *G02B 27/0101* (2013.01); *G02B 13/08* (2013.01); *G02B 27/0911* (2013.01); *G02B 2027/0145* (2013.01)

(58) Field of Classification Search
CPC ............ G02B 13/08; G02B 2027/0145; G02B 27/0101; G02B 27/0911
USPC .................................................. 359/630–633
See application file for complete search history.

(56) References Cited

U.S. PATENT DOCUMENTS

| | | | | |
|---|---|---|---|---|
| 3,865,738 | A * | 2/1975 | Lente ............................... | 352/44 |
| 5,040,058 | A * | 8/1991 | Beamon et al. .............. | 348/782 |
| 5,184,223 | A * | 2/1993 | Mihara .................. | G02B 13/08 |
| | | | | 348/207.99 |
| 5,515,122 | A * | 5/1996 | Morishima ........ | G02B 27/0172 |
| | | | | 353/28 |
| 6,813,086 | B2 | 11/2004 | Bignolles et al. | |
| 2003/0216649 | A1* | 11/2003 | Nowicki ....................... | 600/443 |

FOREIGN PATENT DOCUMENTS

| | | |
|---|---|---|
| DE | 199 24 259 | 12/2000 |
| DE | 601 13 793 | 7/2002 |
| EP | 0 151 455 | 8/1985 |

* cited by examiner

*Primary Examiner* — Joseph P Martinez
*Assistant Examiner* — Vipin Patel
(74) *Attorney, Agent, or Firm* — Volpe and Koenig, P.C.

(57) ABSTRACT

The present invention relates to an optical projection system for a display, and more particularly to an optical projection system for a head-up display with improved light efficiency.

15 Claims, 6 Drawing Sheets transformation

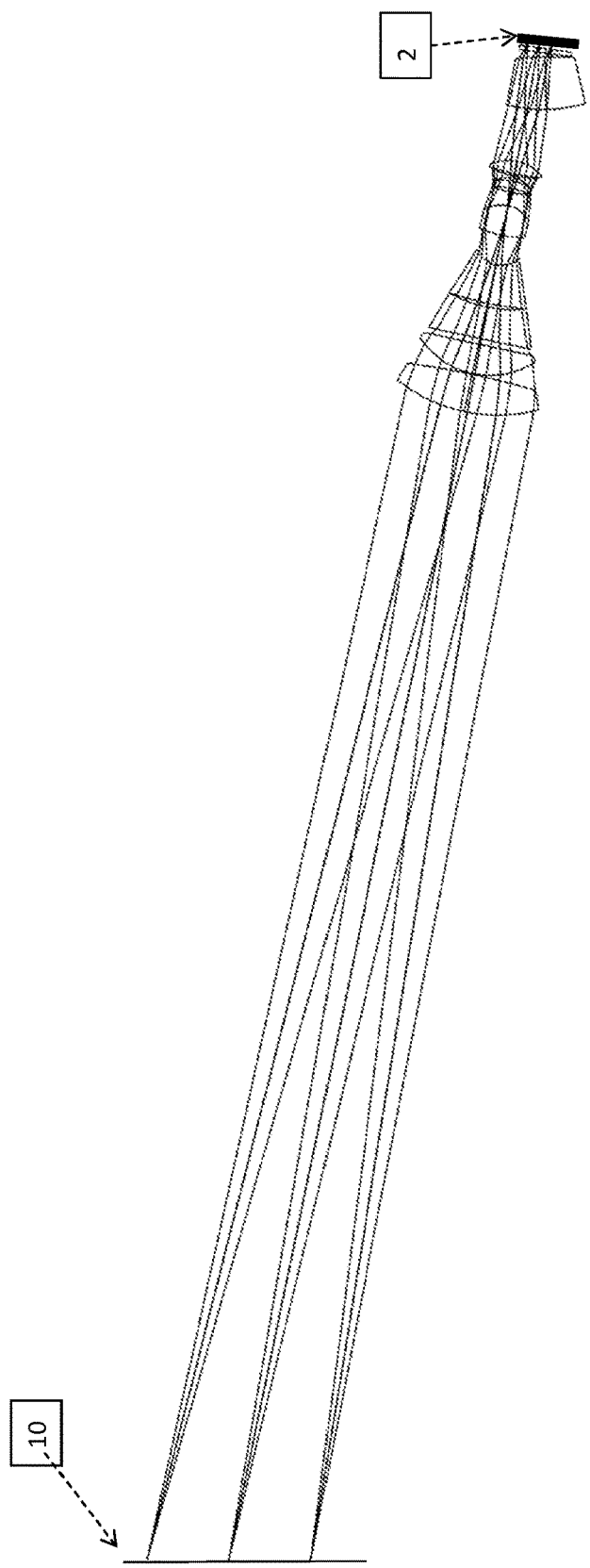

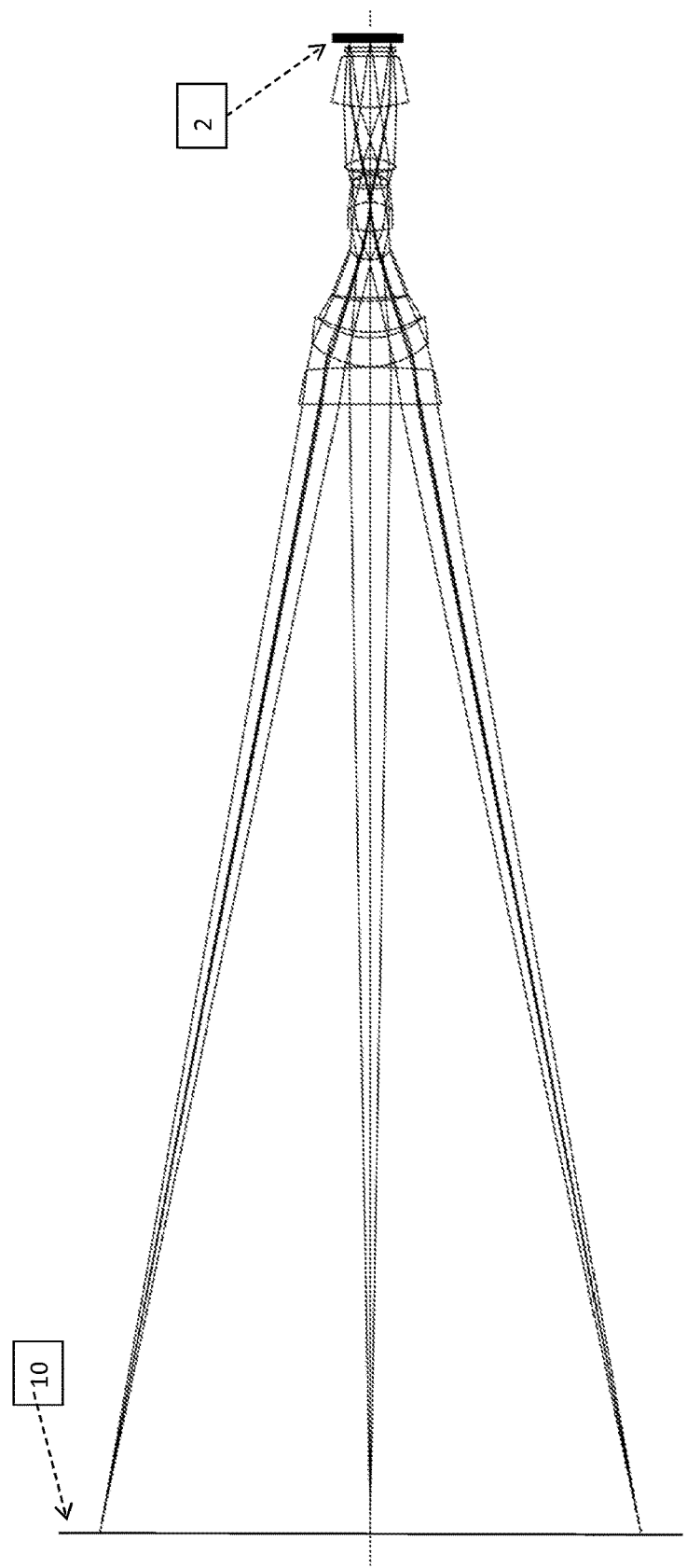

HEAD-UP DISPLAY AND OPTICAL PROJECTION SYSTEM FOR A HEAD-UP DISPLAY

CROSS-REFERENCE TO RELATED PATENT APPLICATIONS

Figure 1:
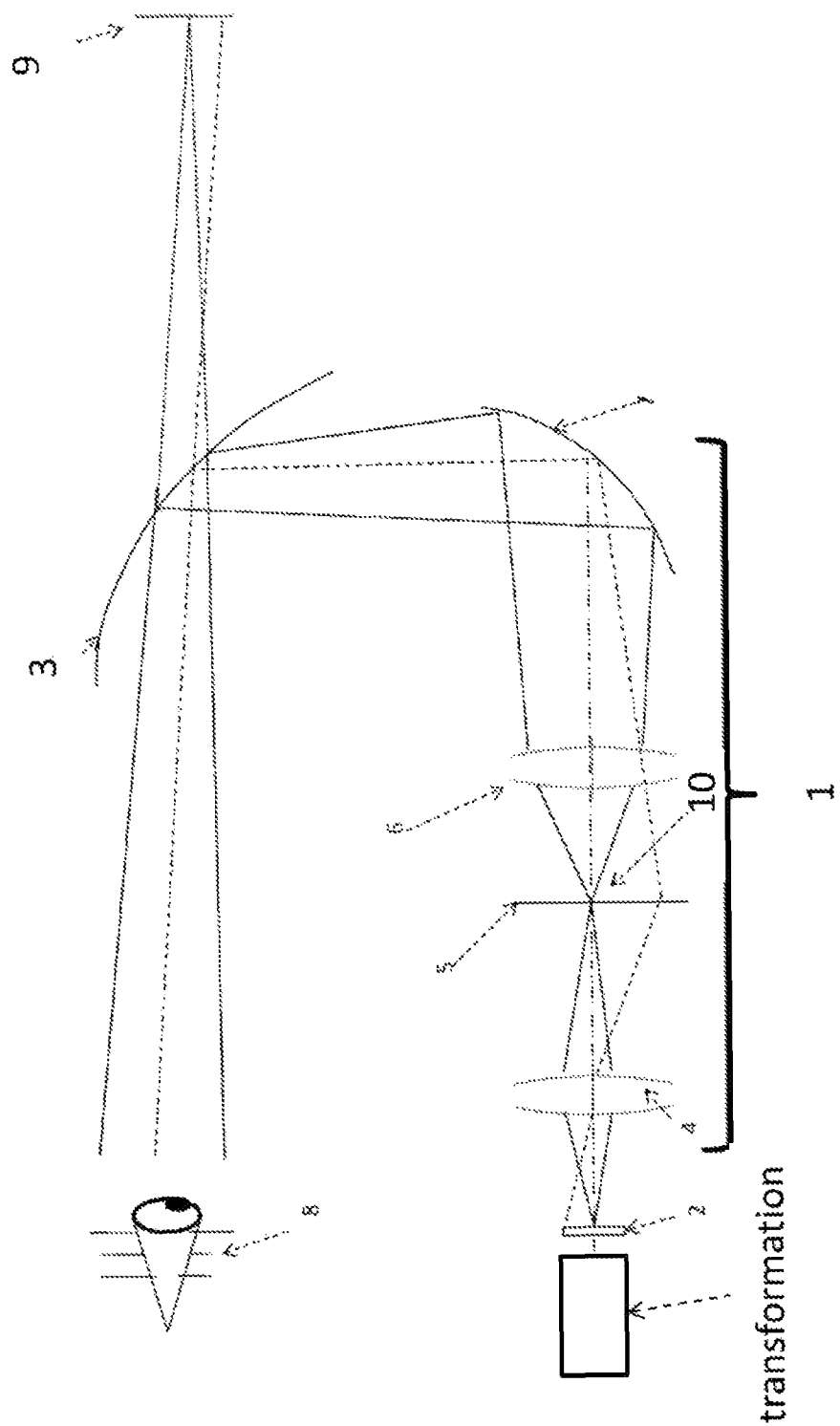

This application claims priority to Germany Application 102012214533.8, filed Aug. 15, 2012 including the specification, drawings, claims and abstract, is incorporated herein by reference in its entirety.

SUMMARY

The present disclosure relates to an optical projection system for a display, in particular an optical projection system for a head-up display with improved light efficiency.

It is therefore the object of the present disclosure to increase the light efficiency of displays that generate a virtual image for an observer and that reflect the virtual image via an optically transparent surface, while using inexpensive components.

The optical projection system according to the disclosure for a display has an image-forming display unit (2) and imaging optics (1) configured to generate a real intermediate image (10) of image information originating from the display unit (2), and to display a virtual image of image information originating from the real intermediate image (10) in a display area (3), wherein the imaging optics (1) comprises an anamorphic lens (4).

ART

A number of projection tasks require generation of a virtual image which is then reflected to an observer via an optically transparent surface, such as a windshield of a motor vehicle. Displays of this type are, for example, so-called head-up displays—also referred to as HUD—or head-mounted displays, also referred to as HMD.

A conventional head-up display is known, for example, from DE 10 2010 002 956A1. Imagers such as a DMD, so-called "dot matrix device", or LCoS so-called "liquid crystal on silicon" are frequently used for the aforementioned types of displays.

Larger image sizes are important for many HUD applications, especially in the horizontal viewing direction, for example, in automotive applications. For those applications requiring large image fields in the horizontal viewing direction, HUD systems with a (real) intermediate image are frequently used, wherein the image information from an imager (i.e. DMD or LCoS) is first displayed on a screen and the required etendue to generate the virtual image is produced on this screen by scattering or other methods.

It is advantageous for cost reasons to use the smallest possible image generator. However, the etendue of such imagers is limited by the small size and acceptance angle. This frequently causes problems with the required brightness in the intermediate image which is required to illuminate the virtual image and the observer's eyebox.

The formats (i.e., the aspect ratio of width to height) of commercially available standard imagers, for example 4:3 or 16:9, are predetermined by other applications, such as projectors. However, much wider formats such as 84×25 mm are often desirable for the intermediate image of a HUD.

In order to nevertheless be able to use inexpensive commercially available standard imagers, only part of the surface of the imager is conventionally used for the virtual image of the HUD.

To produce a sufficiently bright image for the observer, the image information must be emitted by the imager with high intensity, which on one hand increases the costs in the imager and, on the other hand, causes unwanted heating in the region of the imager.

It is therefore the object of the present invention to increase the light efficiency of displays that generate a virtual image and to reflect the virtual image to an observer via an optically transparent surface, while using inexpensive components.

DISCLOSURE

According to one aspect of the present disclosure, an optical projection system for a display is disclosed, which includes an image-forming display unit, imaging optics which is configured to generate a real intermediate image of image information originating from the display unit and to generate a virtual image of image information originating from the image information of the real intermediate image in a display area, wherein the imaging optics and/or the image-forming display unit are formed according to the invention to realize an anamorphic image. Preferably, the imaging optics and/or the image-forming display unit have at least one surface suitable to realize an anamorphic image. Surfaces adapted to realize an anamorphic image may preferably be implemented based on toroidal surfaces (cylindrical lenses) and prisms, wherein the anamorphic image can be produced with prisms by way of the wedge effect (flat surface).

The idea of the present disclosure is to use an anamorphic image for the image from the imager to the intermediate image (preferably shown on a screen), so that the etendue of the entire imager can be used for the actual HUD system in spite of different formats of imager (image-forming display unit) and the part of the intermediate image that contributes to generating the virtual image. The optical efficiency of the HUD system can thereby be increased, so that a comparatively inexpensive imager with a predetermined brightness of the virtual image may be used.

Preferably, the anamorphic surface is arranged between the image-forming display unit and the real intermediate image. Anamorphic adapters based on cylindrical lenses or prisms are known in the art. Alternatively, however, the anamorphic surface may be integrated in the image-forming display unit.

The anamorphic lens of the imaging optics, i.e. the optical element having the anamorphic surface (or the surface performing an anamorphic function) is preferably formed as a separate optical element and arranged between the image-forming display unit and the real intermediate image. Alternatively, however, the anamorphic lens may be integrated in the image-forming display unit.

Preferably, the anamorphic lens is formed as a single lens or as a lens system. Preferably, the anamorphic lens is a cylinder lens. Alternatively, the anamorphic lens may preferably be designed as a cylindrical mirror or as a prism system. Preferably, the anamorphic lens has at least one toroidal surface and/or at least one prism and/or at least one free-form surface.

Preferably, the compression ratio of the anamorphic lens is selected such that the ratio of width to height of the image information from the imaging unit display is increased in the real intermediate image. The image information from the image-forming display unit is preferably increased in width by a factor between 1.5 and 3.0, more preferably between 1.8 and 2.6.

Preferably, a screen is arranged in the real intermediate image. This screen may be implemented as a transmissive screen or a reflective screen. The screen is preferably tilted to avoid reflections from secondary light sources (the sun). Tilting is generally necessary when using reflective screens.

Preferably, the imaging optics for generating a virtual image has at least one concave reflector. This concave reflector is preferably disposed between the (other) elements of the imaging optics and the optically transparent surface (windshield).

Preferably, the image-forming display unit is configured to generate image information composed of a plurality of pixels arranged in form of a matrix. Preferably, the output image from the image-forming display unit (i.e. the object for the imaging optics) has a planar and rectangular shape. Preferably, the output image from the image-forming display unit has a width of between 5 and 10 mm and a height of between 3 and 8 mm. For demanding applications concerning the field of view and resolution, the display unit may also have dimensions of up to 20×10 mm.

Preferably, the image-forming display unit is formed by an LCoS or a DMD. Preferably, the ratio of width to height of the image surface of the image-forming display unit is between 1.2 and 2.0, more preferably between 1.3 and 1.8.

The format of the imager is preferably 4:3 or 16:9. Preferably, intermediate images having a width in the range between 60 and 100 mm are used. The format of the real intermediate image is preferably 84:25, more preferably 84×25 mm.

Preferably, the compression ratio of the anamorphic lens is selected such that the ratio of width to height of the image information from the image-forming display unit in the real intermediate image is between 2.5 and 4.0, more preferably 3.0 to 3.5, and still more preferably between 3.3 and 3.4.

With the optical projection system according to the invention, the brightness of an imager having a standard format of 16:9 and a predetermined intermediate aspect ratio of 84×25 mm can be increased by 89%.

Due to the distortion (widening) of the real intermediate image for the purpose of increasing the brightness of the virtual image, the image information to be projected may advantageously be distorted in advance such that the intermediate image generated by the anamorphic lens is congruent with the original image information (to be projected). The compression ratio of the anamorphic lens is then preferably the inverse of the compression ratio of the calculated distortion. The optical projection system preferably includes means for mathematically transforming the image information to be emitted by the imager, wherein the transformation is preferably an inversion of the (image) transformation produced by the anamorphic lens.

According to another aspect of the present invention, a display with a transparent surface is disclosed, wherein the transparent surface serves as a display area in the viewing direction of an observer, and wherein the display has an optical projection system according to the invention with at least one of the preceding features.

The display is preferably a head-up display or a head-mounted display.

Preferably, the intermediate image is projected onto the optically transparent surface under an angle between 30° and 85°, preferably between 45° and 75° with respect to the normal vector of the optically transparent surface. In a particularly preferred embodiment, the intermediate image is projected onto the optically transparent surface at an angle of ±20°, more preferably ±10° of the Brewster angle with respect to the normal vector of the optically transparent surface. The optically transparent surface (windshield) need not necessarily be planar, but may have some curvature. In such a case, the angle of the normal vector of the optically transparent surface is considered that is located in the geometric center of the part of the area of the optically transparent surface contributing to the reflection.

The optically transparent surface is preferably not mirror-coated, i.e. the reflection (for visible light) of the optically transparent surface is preferably less than 10% at an angle of 0°, more preferably less than 5%.

Preferably, the optical projection system according to the invention is used in a head-up display or a head-mounted display.

Preferably, a focusing unit is arranged between the real intermediate image and the concave reflector.

Preferably, the anamorphic effect is realized with an optical adapter.

An anamorphic adapter is an optical unit, which can optionally be attached to an (output) optical system and which changes the aspect ratio. The (output) optical system can be used as an imaging system even without an adapter. Preferably, the optical adapter includes at least one toroidal surface. In a particularly preferred embodiment, the at least one optical adapter has a cylindrical surface. In an alternative preferred embodiment, the optical adapter has at least one prism. Furthermore, the anamorphic effect is preferable realized by toroidal (cylindrical) surfaces or prisms within the optical projection system (that is, only toroidal/cylindrical or only prisms or a combination of both).

DRAWINGS

Figure 2:
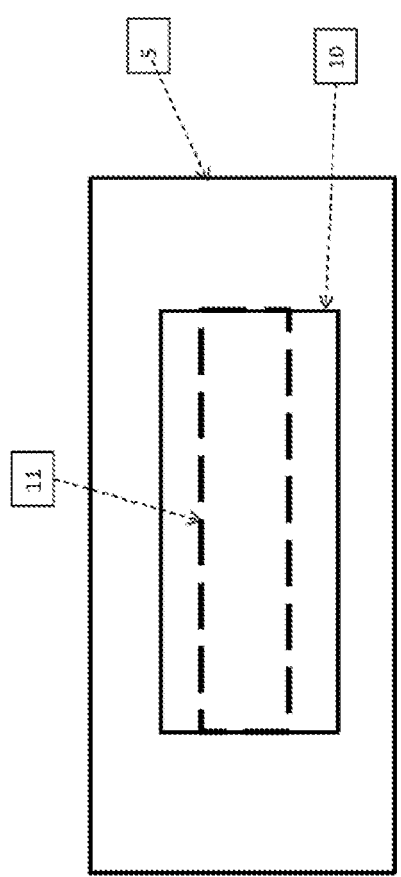
Figure 3:
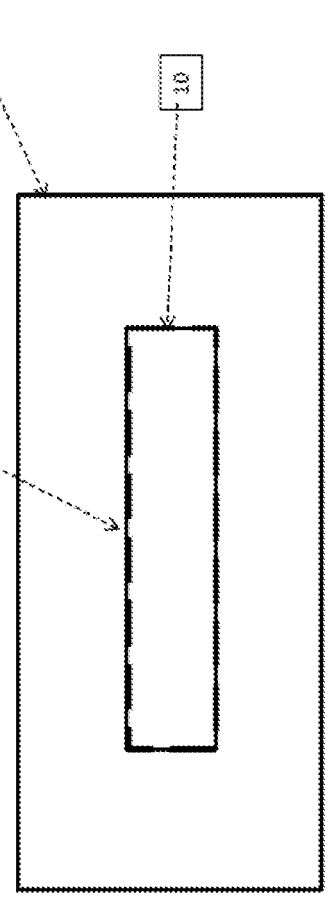
Figure 4B:
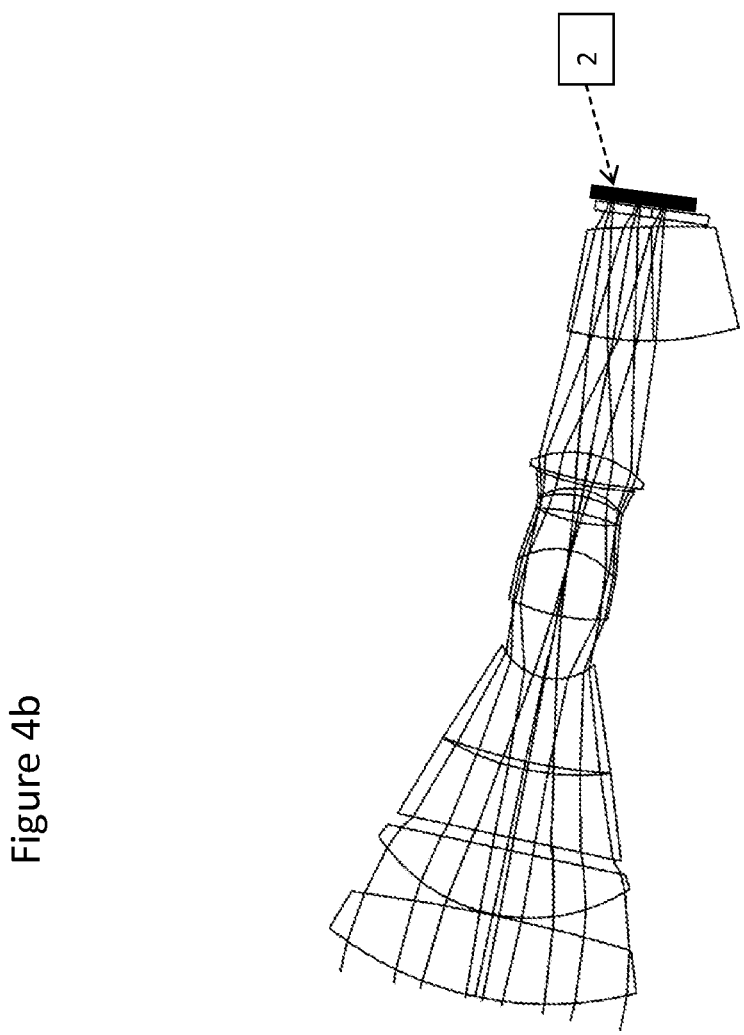
Figure 5B:
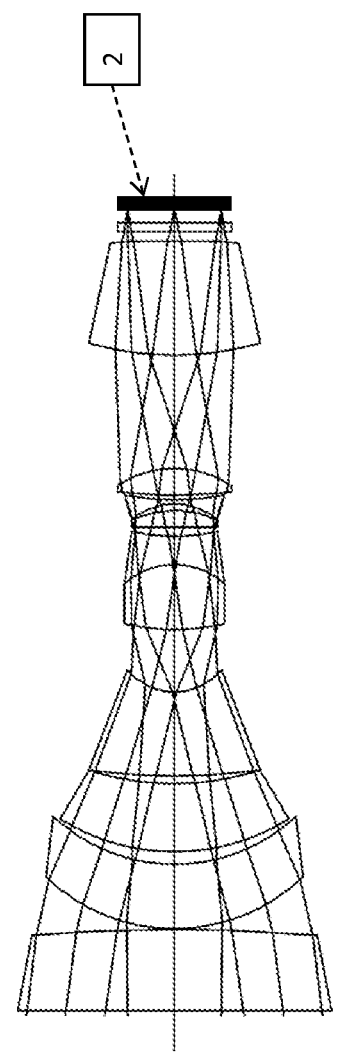

An exemplary embodiment of the invention will be explained in more detail with reference to the drawings and following description. The drawings show in:

FIG. 1 an optical projection system according to the present invention for a head-up display in a schematic, sectional view, FIG. 2 a schematic diagram of the real intermediate image using a conventional optical projection system according to the prior art, and FIG. 3 a schematic diagram of the real intermediate image using an optical projection system according to the present invention, FIG. 4a a horizontal section of an optical projection system with anamorphic effect, FIG. 4b an enlarged view of the optical projection system of FIG. 4a, FIG. 5a a vertical section of the optical projection system of FIG. 4a, and FIG. 5b an enlarged diagram of the optical projection system of FIG. 5a.

FIG. 1 shows a head-up display with an optical projection system 1 according to the present invention. The imager 2 (image-forming display unit) produces a flat, preferably rectangular image information which is displayed to an observer by the optical projection system 1 as a virtual image 8 in the focusing plane 9. The head-up display is preferably configured to show the image information of the imager 2 in different focusing planes. This can be realized, for example, with a concave reflector 7 having a variable focal length. Alternatively, the image information of the imager 2 is displayed in only a single focusing plane 9. The image information of the imager 2 is reflected via the optically transparent surface 3, which operates as a display area. The optically transparent surface 3 functions, for example, as a windshield of a motor vehicle and is therefore not mirror-coated.

In order to produce a sufficiently bright image for the observer 8, the image information must be emitted by the imager 2 with sufficiently high intensity, which may result in increased costs for the imager 2 and unwanted heating in the region of the imager 2.

The optical efficiency of a conventional HUD system is limited because the format of commercially available inexpensive standard imagers (e.g. 4:3 or 16:9) is significantly different from the format of the intermediate image (e.g. 84×25 mm) required in the HUD. Consequently, only a part of the surface of the imager 2 is conventionally used for the virtual image of the HUD, as shown schematically in FIG. 2. Since the aspect ratio of width to height of the imager 2 is significantly less than the effective portion 11 of the intermediate real image 10 contributing in the generation of the virtual image, only a section 11 of the intermediate image 10 has hitherto contributed in the generation of the virtual image, thus necessitating the part of the intermediate image 10 located outside the area 11 to be cut off. This causes a loss in the optical energy, so that the imager 2 must be designed with a correspondingly higher output intensity.

This problem can be contravened according to the invention in that an anamorphic image is produced by the anamorphic lens 4 which is then imaged from the imager 2 to the intermediate image (preferably displayed on a screen 5), so that the etendue of the entire imager 2 is utilized for the actual HUD system in spite of different output formats of the imager 2 (for example, 4:3 or 16:9) and the part 11 of the intermediate image 10 (for example, 84×25 mm) contributing to the generation of the virtual image (as shown schematically in FIG. 3). The compression factor of the anamorphic lens 4 is hereby preferably selected so that the format of the intermediate image 10 matches the part 11 of the real intermediate image 10 effective in generating the virtual image (for example, 84×25 mm).

This makes it now possible to increase the optical efficiency of the HUD system, so that a relatively inexpensive imager 2 with a predetermined brightness of the virtual image can be used.

The intermediate image 10 is subsequently imaged with the focusing unit 6 and the concave mirror 7 via the optically transparent surface 3 as a virtual image that appears in the focal plane 9. Other optical surfaces and/or optical elements may be provided to reduce aberrations. The observer 8 can now perceive the image information generated by the imager 2 as being located behind the transparent surface 9.

Two views of an anamorphic projection system are shown in FIGS. 4a, 4b, 5a and 5b. The system data of this system are included in table form in Table 1. The anamorphic effect of this projection system is realized by four cylindrical surfaces integrated in this projection system. By integrating the cylindrical surfaces in the actual projection system, a compact anamorphic image formation can be realized. The use of anamorphic adapters (based on cylindrical lenses or prisms) requires a larger space. The anamorphic effect within the projection system can also be realized by using toroidal surfaces, free-form surfaces or wedges.

The embodiment depicted in FIGS. 4a, 4b, 5a and 5b represents a projection system in which no image is generated without distortion, i.e. no real image is generated without the cylindrical elements.

TABLE 1

|    |        | Radii    |     | Thicknesses and Air gaps |       | Refractive indices ne |       | Abbe-Number ve |
|----|--------|----------|-----|--------------------------|-------|-----------------------|-------|----------------|
|    | Object | infinite | t1  |                          | n1 =  | 1.48915               | v1 =  | 70.04          |
|    | R1 =   | 24.746   | d1 =| 5.852                    | n2 =  | 1.48915               | v2 =  | 70.04          |
|    |        | infinite | d2 =| 0.050                    | n3 =  | 1.83945               | v3 =  | 42.47          |
|    | R2 =   | −116.123 | d3 =| 4.630                    | n4 =  | 1.53430               | v4 =  | 48.55          |
|    | R3 =   | 12.749   | d4 =| 0.899                    | n5 =  | 1.83945               | v5 =  | 42.47          |
|    | R4 =   | infinite | d5 =| 4.900                    | n6 =  | 1.59667               | v6 =  | 35.03          |
|    |        | 12.175   | d6 =| 0.553                    | n7 =  | 1.51825               | v7 =  | 63.93          |
|    | R5 =   | infinite | d7 =| 6.020                    | n8 =  | 1.59667               | v8 =  | 35.03          |
|    |        | 14.759   | d8 =| 4.480                    | n9 =  | 1.80811               | v9 =  | 46.34          |
|    | R6 =   | 19.300   | d9 =| 4.689                    | n10 = | 1.81335               | v10 = | 40.17          |
|    | R7 =   | 42.595   | d10=| 2.008                    | n12 = | 1.51872               | v11 = | 63.96          |
|    | R8 =   | 4.155    | d11=| 0.648                    |       |                       |       |                |
|    | R9 =   | 14.853   | d12=| 1.225                    |       |                       |       |                |
|    | R10 =  | −5.088   | d13=| 0.459                    |       |                       |       |                |
|    | R11 =  | 12.108   | d14=| 0.300                    |       |                       |       |                |
|    | R12 =  | −17.147  | d15=| 0.313                    |       |                       |       |                |
|    |        | infinite | d16=| 1.947                    |       |                       |       |                |
|    | R13 =  | −6.805   | t2  |                          |       |                       |       |                |
|    | R14 =  | −4.577   | d18=| 8.000                    |       |                       |       |                |
|    | R15 =  | 18.678   | t3  |                          |       |                       |       |                |
|    | R16 =  | 31.776   | d20=| 0.650                    |       |                       |       |                |
|    | R17 =  | −7.104   | d21=| 0.709                    |       |                       |       |                |
| A1 | R18 =  | 20.476   |     |                          |       |                       |       |                |
| A2 | R19 =  | −0.136   |     |                          |       |                       |       |                |
|    | R20 =  | infinite |     |                          |       |                       |       |                |
|    | R21 =  | infinite |     |                          |       |                       |       |                |
|    | R21 =  | infinite |     |                          |       |                       |       |                |

| | Aspherical | |
|---|---|---|
| | A1 | A2 |
| k = | 7.61736E+00 | −4.27515E+05 |
| c2 = | −1.41044E−04 | −3.22610E−04 |
| c3 = | 2.69822E−07 | 1.60346E−06 |

TABLE 1-continued

| | | |
|---|---|---|
| $c_4 =$ | −2.44477E−07 | −6.47548E−08 |
| $c_5 =$ | 7.90700E−09 | 2.80371E−11 |
| $c_6 =$ | −1.13679E−10 | |

| Aspheric equation | $z = (h^2/R)/1 + \mathrm{SQRT}(1 - (1 + k) * (h/r)^2)) + \mathrm{SUMc}(i) * h ** 2i$ $i = 2, 3, 4, \ldots$ | | | |
|---|---|---|---|---|
| Transformation | Reference surface | Displacement | Displacement | Tilt |
| t1 | Image surface | 175.242 | −36.016 | −12.048 |
| t2 | 17 | 8.677 | −2.591 | 13.052 |
| t3 | 19 | 0.666 | 0.000 | −8.840 |

In Table 1, the surfaces 1, 4, 5 and 12 are formed as cylinders, wherein two radii are specified for these surfaces. The first radius operates in the vertical direction (small dimension of the image field, FIG. 4), whereas the second radius operates in the horizontal direction (large dimension of the image field, FIG. 5). The optical system is designed for a 0.3″ imager (DMD from Texas Instruments).

LIST OF REFERENCE SYMBOLS

1 Imaging optics
2 Image-forming display unit
3 Transparent area/display area
4 Anamorphic lens
5 Screen
6 Focusing unit
7 Concave reflector
8 Observer
9 Focusing plane of the virtual image
10 Intermediate image/intermediate image plane
11 Effective part of the virtual image for generating the real intermediate image

What is claimed is:

1. An optical projection system for a display, comprising:
an image-forming display unit configured to emit transformed image information which is derived from original image information by a transformation, wherein the original image information is image information to be projected by the optical projection system and wherein the transformation is a change of the ratio of width to height of the transformed image information compared to the original image information, wherein the full etendue of the entire image-forming display is used for the emittance of the transformed image information due to the transformation; and
imaging optics which is configured to generate a real intermediate image of the transformed image information originating from the display unit and to display in a display area a virtual image of image information originating from the real intermediate image,
wherein the imaging optics comprises an anamorphic lens configured to generate the real intermediate image from the transformed image information originating from the display unit,
wherein the transformation of the original image information into the transformed image information for emittance by the display unit is performed prior to the emittance by the display unit by a means for mathematically transforming the original image information, and
wherein the transformation is an inversion of a distortion resulting from an image transformation produced by the anamorphic lens such that the real intermediate image generated by the anamorphic lens is congruent with the original image information.

2. The optical projection system of claim 1, wherein the anamorphic lens is arranged between the image-forming display unit and the real intermediate image.

3. The optical projection system of claim 1, wherein a compression ratio of the anamorphic lens is selected such that the ratio of width to height of the image information originating from the image-forming display unit is increased in the real intermediate image.

4. The optical projection system of claim 3, wherein the compression ratio of the anamorphic lens is selected such that the ratio of width to height of the image information originating from the image-forming display unit in the real intermediate image is increased by a factor between 1.5 and 3.0.

5. The optical projection system of claim 1, wherein the imaging optics comprises a screen arranged in the real intermediate image and/or at least one concave reflector.

6. The optical projection system of claim 1, wherein the image-forming display unit is configured to produce image information composed of a plurality of pixels arranged in form of a matrix.

7. The optical projection system of claim 1, wherein the anamorphic lens comprises at least a toroidal surface, at least a prism and/or at least a free-form surface.

8. The optical projection system of claim 7, wherein the toroidal surface is a cylindrical surface.

9. The optical projection system of claim 1, wherein the ratio of width to height of the image area of the image-forming display unit is between 1.3 and 2.0.

10. The optical projection system of claim 1, wherein a compression ratio of the anamorphic lens is selected such that the ratio of width to height of the image information originating from the image-forming display unit in the real intermediate image is between 3.0 and 3.5.

11. The optical projection system of claim 1, wherein the optical projection system comprises an optical adapter arranged between the image-forming display unit and the imaging optics.

12. The optical projection system of claim 11, wherein the optical adapter comprises an anamorphic lens.

13. The optical projection system of claim 12, wherein the optical adapter comprises at least a toroidal surface, at least a prism and/or at least a free-form surface.

14. The optical projection system of claim 13, wherein the toroidal surface is a cylindrical surface.

15. A head-up display with a transparent surface functioning as a display area in the viewing direction of an observer, the head-up display comprising an optical projection system, wherein the optical projection system comprises:

an image-forming display unit configured to emit transformed image information which is derived from original image information by a transformation, wherein the original image information is the image information to be projected by the optical projection system and wherein the transformation is a change of the ratio of width to height of the distorted image information compared to the original image information, wherein a ratio of width to height of the original image information is different from a ratio of width to height of an image forming display; and imaging optics which is configured to generate a real intermediate image of the transformed image information originating from the display unit and to display in a display area a virtual image of image information originating from the real intermediate image, wherein the imaging optics comprises an anamorphic lens configured to generate the real intermediate image from the transformed image information originating from the display unit, wherein a transformation of the original image information into the transformed image information for emittance by the display unit is performed prior to the emittance by the display unit by a means for mathematically transforming the original image information, and wherein the transformation is an inversion of a distortion resulting from an image transformation produced by an anamorphic lens such that the real intermediate image generated by the anamorphic lens is congruent with the original image information.

* * * * *